United States Patent
Logan et al.

(10) Patent No.: US 6,877,191 B2
(45) Date of Patent: Apr. 12, 2005

(54) BAND CLAMP

(75) Inventors: Dan T. Logan, Freemont, IN (US); Steven E. Yates, Ft. Wayne, IN (US)

(73) Assignee: DWWS, LLC, Clinton, TN (US)

( * ) Notice: Subject to any disclaimer, the term of this patent is extended or adjusted under 35 U.S.C. 154(b) by 488 days.

(21) Appl. No.: 09/954,532

(22) Filed: Sep. 17, 2001

(65) Prior Publication Data

US 2005/0039306 A1 Feb. 24, 2005

(51) Int. Cl.[7] .......................... A44B 21/00; B65D 63/02; F16L 33/04
(52) U.S. Cl. ............................ 24/279; 24/20 R; 24/19; 24/20 LS; 24/20 EE; 285/114; 285/419
(58) Field of Search ...................... 24/279, 19, 20 LS, 24/20 R, 20 EE, 16 PB; 285/114, 410, 419, 382; 411/41

(56) References Cited

U.S. PATENT DOCUMENTS

| | | | |
|---|---|---|---|
| 1,975,925 A | | 10/1934 | Compo |
| 2,227,551 A | | 1/1941 | Morris |
| 2,599,882 A | | 6/1952 | Adams |
| 3,154,330 A | * | 10/1964 | Clark et al. ............... 285/419 |
| 3,303,669 A | * | 2/1967 | Oetiker ...................... 24/20 R |
| 3,905,623 A | | 9/1975 | Cassel |
| 4,312,526 A | * | 1/1982 | Cassel ....................... 285/419 |
| 4,364,588 A | * | 12/1982 | Thompson ................. 285/419 |
| 4,629,226 A | | 12/1986 | Cassel et al. |
| 4,660,862 A | * | 4/1987 | Cassel et al. .............. 285/114 |
| 4,813,720 A | * | 3/1989 | Cassel ....................... 285/419 |
| 5,010,626 A | * | 4/1991 | Dominguez ................. 24/279 |

* cited by examiner

Primary Examiner—Victor Sakran
(74) Attorney, Agent, or Firm—Pitts & Brittian, P.C.

(57) ABSTRACT

An improved band clamp for securely clamping the end of a flexible hose to one of at least a rigid pipe, a cast outlet of a radiator, a charge air cooler and a turbocharger in order to prevent fluid communication between the two. The improved band clamp includes a clamp band which is configured to circumvent a substantial portion of the hose. The clamp band defines first and second ends, each of which is defined by a terminal portion of the clamp band folded over on itself to define a double thickness, and then formed in an arcuate configuration away from the center of the clamp band. A spline is provided for being received between each of the first and second ends of the clamp band. First and second spacers are provided on the outer sides of the clamp band first and second ends. The first spacer, each of the first and second clamp band ends, and the spline each define an opening to cooperatively receive a bolt. The second spacer defines a threaded opening to receive the bolt in threaded engagement. The band defines a circumferential bead extending inwardly from the center of the band. An extender is carried within the band to extend between the terminal portions of the bead and to cover the gap between the first and second ends of the band. The extender is secured at one end to the inside of the band, with the other end remaining free to slide along the length of the band as the band clamp is tightened or loosened. The extender defines a bead along the entirety of its length to cooperate with the bead defined by the band.

5 Claims, 3 Drawing Sheets

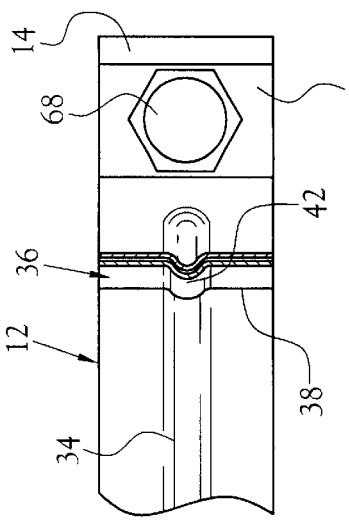
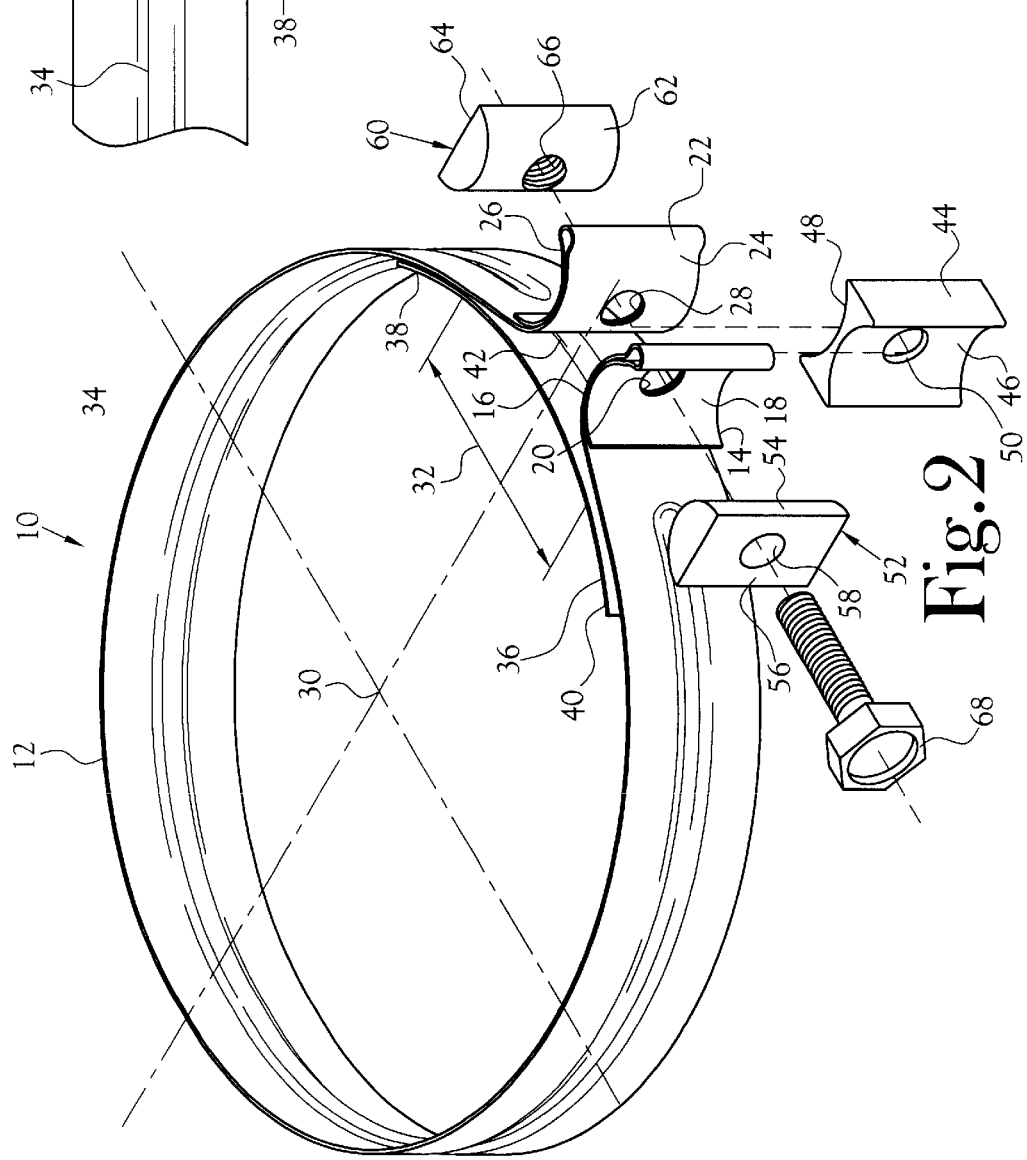

BAND CLAMP

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

This invention relates to the field of clamping devices. More specifically, the present invention relates to an improved band clamp for clamping the end of a flexible hose to one of at least a rigid pipe, a cast outlet of a radiator, a charge air cooler and a turbocharger in order to establish fluid communication between the two.

2. Description of the Related Art

Band clamps of various configurations are well known in the prior art. The band clamp is characterized by a band member that extends substantially around the circumference of a pipe or hose. The two ends of the band are then fastened together in order to tighten the band around the pipe or hose. This type of clamp is illustrated in U.S. Pat. No. 1,975,925 issued to Compo on Oct. 9, 1934. A similar clamp is disclosed by Morris in U.S. Pat. No. 2,227,551 issued on Jan. 7, 1941. In this embodiment, the band defines a greater width and is fastened by a plurality of bolts, with the bolts being oriented in two directions. Morris also discloses a cylindrical gasket disposed within the band clamp to increase the effectiveness of the clamp. This disclosure illustrates the need in certain situations to provide greater clamping ability in certain applications.

In U.S. Pat. No. 2,599,882 issued to Adams on Jun. 10, 1952, the inventor introduces a stabilizing bridge between the ends of the clamping ring. The bolt used to tighten the clamping ring is received through a portion of the stabilizing bridge. The stabilizing bridge is configured to prevent the bolt from bending when tensioned. Therefore, when adequate tension is applied to the bolt in order to maintain the band clamp securely fashioned, the stabilizing bridge prevents the bolt from being defeated.

An improvement to each of these clamps is disclosed in each of U.S. Pat. No. 3,905,623 issued to Cassel on Sep. 16, 1975 and U.S. Pat. No. 4,629,226 issued to Cassel et al., on Dec. 16, 1986. One of the purposes of the '623 and '226 devices is to eliminate a circumferential gap between the flanges of the clamping ring or sleeve of prior devices such as those discussed above. The band clamp disclosed by Cassel and Cassel et al., comprises a clamping band adapted to be disposed about the end of the outer pipe, the end of an inner pipe being received within the outer pipe. The ends of the clamping band extend radially outward to define a pair of side walls with an hour-glass shaped sector defined between. The ends of the clamping band are then folded back to define a double layer thickness at the side walls. Each of the side walls defines an arcuate configuration in order to define the hour-glass configuration of the sector defined between.

The clamping band is provided with a tightening means which is comprised of a spline configured to be closely received within the hour-glass shaped sector defined between the two side walls. A spacer is disposed on the outer surface of each of the side walls. Each spacer defines a convex surface configured to be closely received in the arc of each side wall, and on opposing flat surface. One of the spacers defines an opening for receiving a bolt post there through. In cooperating fashion, each of the side walls and the spline define openings for receiving the bolt post. The remaining spacer defines a threaded opening for threadably engaging the bolt post in order to tighten the clamping ring on the outer pipe.

BRIEF SUMMARY OF THE INVENTION

Other objects and advantages will be accomplished by the present invention which serves to securely clamp the end of a flexible hose to one of at least a rigid pipe, a cast outlet of a radiator, a charge air cooler and a turbocharger in order to prevent fluid communication between the two. Moreover, the clamp is designed to provide a seal around the entire circumference of the hose and pipe by providing an inwardly-extending, circumferential bead around the entire circumference of the clamp.

The improved band clamp includes a clamp band which is configured to circumvent a substantial portion of the hose. The clamp band defines first and second ends, each of which is defined by a terminal portion of the clamp band folded over on itself to define a double thickness, and then formed in an arcuate configuration away from the center of the clamp band. A spline is provided for being received between each of the first and second ends of the clamp band. The spline defines opposing surfaces each defining a concave configuration. The concave sides are configured in such a manner so as to closely receive the convex side of the arcuately shaped first and second ends. First and second spacers each define a convex interior surface and a flat exterior surface. The convex interior surface is configured to closely engage the concave side of the respective first or second end of the clamp band. The first spacer, each of the first and second clamp band ends, and the spline each define an opening to cooperatively receive a bolt. The second spacer defines a threaded opening to receive the bolt in threaded engagement.

The band defines a circumferential bead extending inwardly from the center of the band. The bead terminates prior to each of the first and second ends. An extender is carried within the band to extend between the terminal portions of the bead and to cover the gap between the first and second ends of the band. The extender is secured at one end to the inside of the band, with the other end remaining free to slide along the length of the band as the band clamp is tightened or loosened. The extender defines a bead along the entirety of its length to cooperate with the bead defined by the band.

BRIEF DESCRIPTION OF THE SEVERAL VIEWS OF THE DRAWINGS

The above mentioned features of the invention will become more clearly understood from the following detailed description of the invention read together with the drawings in which:

FIG. 2 is an exploded perspective view of the improved band clamp of FIG. 1;

FIG. 3 is a partial side elevation view of the improved band clamp, in section taken at 3—3 of FIG. 1.

DETAILED DESCRIPTION OF THE INVENTION

Figure 1:
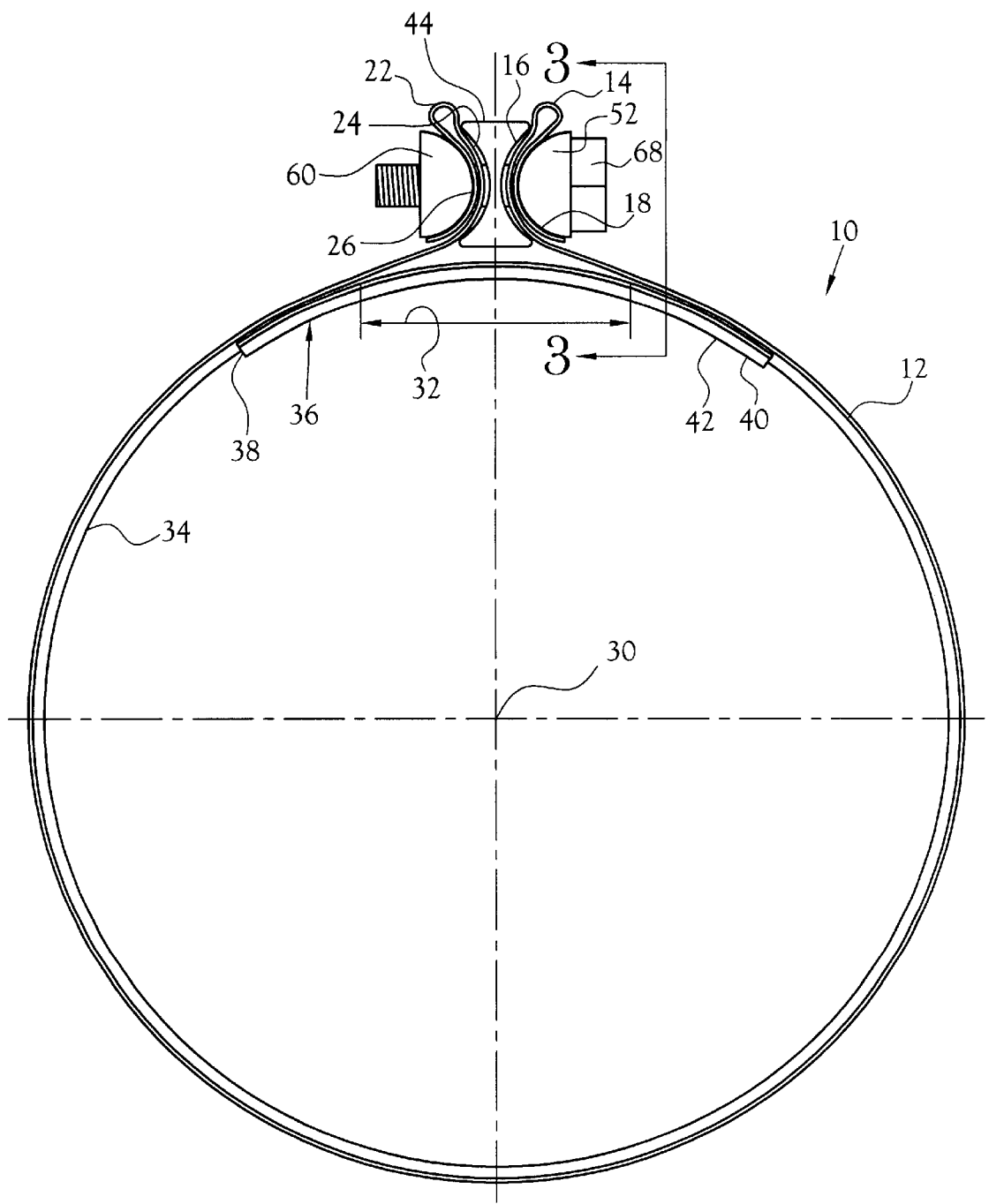
FIG. 1 is a plan view of the improved band clamp constructed in accordance with several features of the present invention.

An improved band clamp incorporating various features of the present invention is illustrated generally at 10 in the figures. The improved band clamp, or clamp 10, is designed for securely clamping the end 102 of a flexible hose 100 to one of at least a rigid pipe 104, a cast outlet of a radiator, a charge air cooler and a turbocharger. The clamp 10 is designed to prevent fluid communication between the hose 100 and pipe 104. Moreover, the clamp 10 is designed to provide a seal around the entire circumference of the hose 100 and pipe 104.

The clamp 10 of the present invention includes a clamp band 12 which is configured to circumvent a substantial portion of the hose 100. For ease of explanation, it will be understood that a reference to the hose 100 or the pipe 104 is a reference to the structural arrangement of the hose end 102 received over the pipe end 106 to establish fluid communication between the hose 100 and the pipe 104. It will also be understood that other types of conduits may be suitable for connection using the clamp 10 of the present invention. Accordingly, the present disclosure is not limited merely to a flexible hose 100 and a rigid pipe 104.

Referring to the illustration of FIG. 1, the clamp band 12 defines first and second ends 14,22. Each of the first and second ends 14,22 is defined by a terminal portion of the clamp band 12 folded over on itself to define a double thickness, and then formed in an arcuate configuration away from the center 30 of the clamp band 12. To this extent, the clamp band 12 is formed to define a substantially circular configuration. A spline 44 is provided for being received between each of the first and second ends 14,22 of the clamp band 12. The spline 44 defines opposing surfaces 46,48 each defining a concave configuration. The concave sides 46,48 are configured in such a manner so as to closely receive the convex side 16,24 of the arcuately shaped first and second ends 14,22, respectively. First and second spacers 52,60 each define a convex interior surface 54,62 and a flat exterior surface 56,64. The convex interior surface 54,62 is configured to closely engage the concave side 18,26 of the respective first or second ends 14,22 of the clamp band 12. The first spacer 52, each of the first and second clamp band ends 14,22, and the spline 44 each define an opening 58,20,28,44, respectively, to cooperatively receive a bolt 68. The second spacer 60 defines a threaded opening 66 to receive the bolt 68 in threaded engagement. Thus, a bolt 68 is inserted through the first spacer opening 58, the first end opening 20, the spline opening 50 and the second end opening 28. The bolt 68 is then threadably engaged within the second spacer opening 66 until the clamp band 12 is tightly secured about the hose 100.

In order to enhance the engagement of the band clamp 10 on the hose 100 and pipe 102 assembly, and therefore the sealing qualities of the band clamp 10, the band 12 defines a circumferential bead 34 extending inwardly from the center of the band 12. As illustrated best in FIG. 2, the bead 34 terminates prior to each of the first and second ends 14,22. In order to complete the bead 34 throughout the circumference of the hose 100 and pipe 104 assembly, an extender 36 is carried within the band 12 to extend between the terminal portions of the bead 42 and to cover a gap 32 defined between the first and second ends 14,22 of the band 12.

The extender 36 is secured at one end 38 to the inside of the band 12, with the other end 40 remaining free to slide along the length of the band 12 as the band clamp 10 is tightened or loosened. The extender 36 defines a bead 42 along the entirety of its length to cooperate with the bead 34 defined by the band 12. FIG. 3 illustrates the cooperative relationship between the clamp band bead 34 and the extender bead 42. Thus, the clamp band 12 and the extender 36 combine to define a continuous bead 34,42 around the entire circumference of the hose 100 and pipe 104 assembly, the circumference of the band clamp 10 being adjustable without interfering with the integrity of the bead 34,42. As the band clamp 10 is tightened over the hose 100 and pipe 104 assembly, the bead 34,42 serves to compress the hose 100 to enhance the seal between the hose 100 and the pipe 104.

Figure 4:
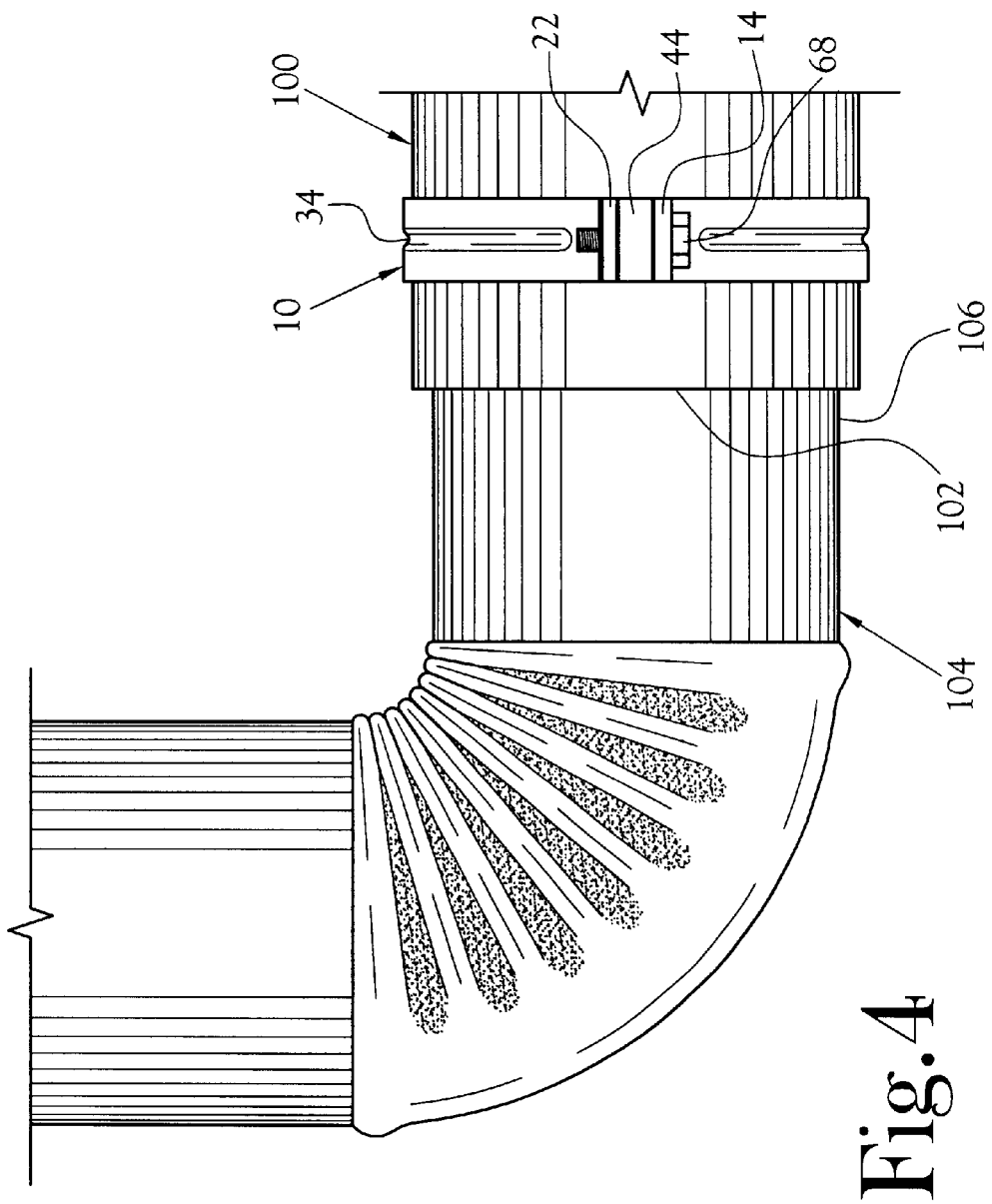
FIG. 4 illustrates an elevation view of the band clamp of FIG. 1 shown installed on a hose and pipe assembly to create a seal between the hose and pipe.

As illustrated in FIG. 4, the clamp band 10 is engaged about the distal end 102 of the hose 100, which is in turn placed over the pipe end 106 to which it is to be secured. Once the appropriate placement of the pipe 104, hose 100 and band clamp 10 has been achieved, the bolt 68 is engaged to draw the second spacer 60 toward the first spacer 52, and thus the first and second clamp band ends 14,22 toward one another. In so doing, the band clamp 10 is tightened about the hose 100 and pipe 104 assembly. The bead 34 defined by the clamp band 10 and the extender 36 are pressed tightly into the hose 100, thus creating a tight seal between the hose 100 and the pipe 104. As the band clamp 10 is tightened, the distal end 40 of the extender 36 is slid along the interior surface of the clamp band 12, thus maintaining the integrity of the circumferential bead 34,42, and thus the integrity of the seal.

From the foregoing description, it will be recognized by those skilled in the art that an improved band clamp offering advantages over the prior art has been provided. Specifically, the clamp is designed for securely clamping the end of a flexible hose to one of at least a rigid pipe, a cast outlet of a radiator, a charge air cooler and a turbocharger in order to prevent fluid communication between the two. Moreover, the clamp is designed to provide a seal around the entire circumference of the hose and pipe by providing an inwardly-extending, circumferential bead around the entire circumference of the clamp.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. A band clamp for securely clamping one end of a flexible hose to one of at least a rigid pipe, a cast outlet of a radiator, a charge air cooler and a turbocharger, said improved band clamp comprising:

a band adapted to circumvent a substantial portion of the flexible hose, said band defining first and second ends, each of said first and second ends being formed to define an arcuate configuration having a convex side and a concave side, said convex side of said first end facing said convex side of said second end, said band defining a circumferential bead extending inwardly from a center of said band, said bead defining a first end terminating prior to said band first end and a second end terminating prior to said band second end, a gap being defined between said bead first end and said bead second end;

a fastening device including a spline configured to be closely received between said band first and second ends, a first spacer disposed on said concave side of said band first end, a second spacer disposed on said concave side of said band second end, and a bolt, each of said first spacer, said band first and second ends and said spline defining a through opening for receiving said bolt, said second spacer defining a threaded opening configured to threadably engage said bolt; and an extender carried within said band to extend between said bead first and second ends to cover said gap, said extender defining a first end secured to an interior surface of said band proximate to and overlapping one of said bead first end and said bead second end, said extender defining a second end unsecured to said band in order slide along said interior surface of said band, said extender defining a bead extending inwardly entirely between said extender first end and said extender second end to cooperate with said band bead.

2. The band clamp of claim 1 wherein each of said band first end and said band second end is formed by folding over a terminal portion of said band to define a double thickness.

3. The band clamp of claim 1 wherein each of said first spacer and said second spacer defines a convex interior surface and a flat exterior surface, said convex interior surface configured to closely engage said concave side of one of said band first end and said band second end.

4. The band clamp of claim 1 wherein said spline defines first and second opposing concave surfaces configured to closely receive said convex side of said band first end and said band second end.

5. In a band clamp for securely clamping one end of a flexible hose to one of at least a rigid pipe, a cast outlet of a radiator, a charge air cooler and a turbocharger, the band clamp having a band adapted to circumvent a substantial portion of the flexible hose, the band defining first and second ends, each being formed to define an arcuate configuration having a convex side and a concave side, said convex side of the first end facing said convex side of the second end, and a fastening device including a spline configured to be closely received between the band first and second ends, a first spacer disposed on the concave side of the band first end, a second spacer disposed on the concave side of the band second end, and a bolt, each of the first spacer, the band first and second ends and the spline defining a through opening for receiving the bolt, and the second spacer defining a threaded opening configured to threadably engage the bolt, an improvement comprising:

a circumferential bead extending inwardly from a center of the band, said bead defining a first end terminating prior to said band first end and a second end terminating prior to said band second end, a gap being defined between said bead first end and said bead second end; and an extender carried within the band to extend between said bead first and second ends to cover said gap, said extender defining a first end secured to an interior surface of the band proximate to and overlapping one of said bead first end and said bead second end, said extender defining a second end unsecured to the band in order slide along the interior surface of the band, said extender defining a bead extending inwardly entirely between said extender first end and said extender second end to cooperate with said band bead.

* * * * *